(12) United States Patent
Reedman (10) Patent No.: US 10,681,555 B2
(45) Date of Patent: Jun. 9, 2020

(54) RADIO FREQUENCY RADIATION SHIELD DEVICE

(71) Applicant: International Business Machines Corporation, Armonk, NY (US)

(72) Inventor: Ivan J. Reedman, Cheltenham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/153,128

(22) Filed: Oct. 5, 2018

(65) Prior Publication Data
US 2020/0112859 A1  Apr. 9, 2020

(51) Int. Cl.
*H04W 12/12* (2009.01)
*H04B 5/00* (2006.01)

(52) U.S. Cl.
CPC ...... *H04W 12/1204* (2019.01); *H04B 5/0025* (2013.01)

(58) Field of Classification Search
CPC .......................... H04W 12/1204; H04B 5/0025
See application file for complete search history.

(56) References Cited

U.S. PATENT DOCUMENTS

| | | | |
|---|---|---|---|
| 8,587,403 B2 | 11/2013 | Ghabra et al. | |
| 8,841,987 B1* | 9/2014 | Stanfield | G07C 9/00857 340/5.61 |
| 9,102,296 B2 | 8/2015 | Seiberts et al. | |
| 9,800,610 B1* | 10/2017 | Lu | H04L 63/1466 |
| 2003/0001723 A1* | 1/2003 | Masudaya | B60R 25/24 340/5.61 |
| 2006/0114100 A1* | 6/2006 | Ghabra | E05B 81/78 340/5.61 |
| 2009/0053996 A1* | 2/2009 | Enguent | G06K 19/0701 455/26.1 |
| 2009/0261945 A1* | 10/2009 | Ko | B60R 25/245 340/5.61 |
| 2010/0321154 A1 | 12/2010 | Ghabra et al. | |
| 2012/0176282 A1* | 7/2012 | Kato | G06K 19/07749 343/702 |

(Continued)

OTHER PUBLICATIONS

Francillon et al., "Relay Attacks on Passive Keyless Entry and Start Systems in Modern Cars," https://www.research-collection.ethz.ch/bitstream/handle/20.500.11850/42365/eth-4572-01.pdf, 2011, 16 pgs.

(Continued)

*Primary Examiner* — Ankur Jain
(74) *Attorney, Agent, or Firm* — Jared L. Montanaro (57) ABSTRACT

A radio frequency radiation shield device may comprise a receiver for detecting a near field radio frequency signal. The receiver may include one or more receiving antennas for target frequencies. The shield device may further comprise a signal processor that samples signal characteristics of a detected signal and determines a nullifying signal in response to detecting a signal characteristic of the detected signal on a receiving antenna meets a trigger threshold. The nullifying signal may comprise a modulated version of the detected signal. The shield device may further comprise a signaler for generating the nullifying signal. The shield device may further comprise a transmitter. The transmitter may include a transmitting antenna at target frequencies for transmitting the nullifying signal.

25 Claims, 8 Drawing Sheets

(56) References Cited

U.S. PATENT DOCUMENTS

| | | | |
|---|---|---|---|
| 2012/0182122 A1* | 7/2012 | Nishiguchi | H04W 52/283 340/5.61 |
| 2013/0114228 A1* | 5/2013 | Merz | H05K 1/0218 361/783 |
| 2014/0375420 A1 | 12/2014 | Seiberts et al. | |
| 2015/0022332 A1* | 1/2015 | Lin | B60R 25/00 340/426.1 |
| 2016/0075307 A1* | 3/2016 | Jakobsson | B60R 25/31 701/2 |
| 2016/0148448 A1* | 5/2016 | Blatz | B60R 25/24 340/5.61 |
| 2017/0294062 A1* | 10/2017 | Van Wiemeersch | G07C 9/00111 |
| 2018/0134253 A1 | 5/2018 | Zielinski et al. | |

OTHER PUBLICATIONS

Glocker et al., "A protocol for a secure remote keyless entry system applicable in vehicles using symmetric-key cryptography," https://arxiv.org/1612.00993.pdf, Dec. 3, 2016, 6 pgs.

McCann, "Car thieves target middle-class areas, as police warn drivers to invest in a steering wheel lock," https://www.telegraph.co.uk/news/2018/04/10/car-thieves-target-middle-class-areas-data-reveals-police-warn/?WT.mc_id=tmgliveapp_iosshare_AqfMbRCnsRcy, Apr. 11, 2018, 3 pgs.

Van De Beek et al., "Vulnerability of Remote Keyless-Entry Systems Against Pulsed Electromagnetic Interference and Possible Improvements," https://ieeexplore.ieee.org/document/7482738/, IEEE Transactions on Electromagnetic Compatibility, vol. 58, No. 4, Aug. 2016, pp. 1259-1265.

* cited by examiner

RADIO FREQUENCY RADIATION SHIELD DEVICE

BACKGROUND

The present disclosure relates to a radio frequency radiation shield device, and more specifically, to an active radio frequency radiation shield device for transmitting nullifying signals.

Radio waves are used in a number of security access devices, such as remote keyless entry (RKE) vehicle devices and radio frequency identification (RFID) access cards, and such devices may need protection against incoming radio waves utilized in amplification, relay, or other forms of attacks used to operate the target equipment in ways it was not intended.

Taking the example of RKE, tens of millions of vehicles worldwide use this technology. A key fob is provided with a radio frequency antenna. When the driver touches the door handle for example, the car detects this and sends a low frequency message using near field communications to the key fob, which is usually on the driver. The key fob receives this near field communication and sends back a higher frequency message to the vehicle authorizing the unlocking of the vehicle doors. The same process is used for remote keyless start. When the driver sits in the vehicle seat and presses the start button, the car uses a near field antenna around the driver's seat to again send a near field message to the key fob, which in turn responds with a higher frequency message authorizing the vehicle to start the engine.

The security failing in this technology is that near field communications, which are radio frequency communications that operate in the near field utilizing transmission signals of very weak power to communicate, can be relayed or amplified. This invalidates the design assumption that near filed communications only work in close proximity. When a relay attack is used, a small near field receiver is used by an attacker when they approach the vehicle, their partner has the other end of the relay tool and points it to where the attackers believe the key fob is located inside a house. The relay receives the near field message, relays it to the other end of the tool, which then sends the message out with much higher power. The key fob receives the message and believes it must be near the vehicle so it sends back a message to authorize the action.

An amplification attack is similar, but simpler. A near field antenna on a wand is used by a first attacker and it is connected via a cable to the other end which is used by a second attacker with an amplifier. When the wand receives the message, the amplifier re-transmits it with much higher power. The same process then occurs where the key fob receives the message and authorizes the action.

A Faraday cage is a known form of protection in the form of an enclosure used to block electromagnetic fields. A Faraday cage is an enclosure formed by a continuous covering of conductive material or mesh. An external electrical field causes the electric charges within the cage's conducting material to be distributed such that they attenuate the field's effect in the cage's interior. This is used to protect sensitive electronic equipment from external radio frequency interference.

Faraday cages or Faraday bags that provide Faraday cage functions are expensive and the more they are used the less effective they become because of wear and tear to the seals. Also, discipline is required to always put a key fob or other device inside the Faraday bag. Furthermore, radio frequencies used in RKE or RFID are very hard to block as they are low frequency waves.

SUMMARY

According to an aspect of the present disclosure there is provided a radio frequency radiation shield device, the device comprising: a receiver for detecting a near field radio frequency signal including one or more receiving antennas for target frequencies; a signal processor for, responsive to detecting a signal characteristic of a detected signal on a receiving antenna meeting a trigger threshold: sampling signal characteristics of the detected signal; and determining a nullifying signal that results in interference with the detected signal to nullify the detected signal, the nullifying signal comprising a modulated version of the detected signal; a signal generator for generating the nullifying signal; and a transmitter including a transmitting antenna at the target frequencies for transmitting the nullifying signal.

This has the advantage of responding to a detected incoming signal by transmitting a nullifying signal to protect electronic devices within the transmission field of the shield device. The protection may be by preventing the electronic device from receiving a valid incoming signal or by preventing an incoming signal leaking from the electronic device from being received by other parties.

The signal processor may repeat the sampling and transmitting of a determined nullifying signal at time intervals to provide the nullifying signal in response to a presence and form of the detected signal. This feature may cause the nullifying signal to be varied, which may nullify varying incoming signals.

In some embodiments, the signal processor for determining a nullifying signal may determine that there is a signal providing destructive interference with the detected signal to cancel or dampen the detected signal. This may result in no or a minimal resultant signal that cannot be read. In another embodiment, the signal processor for determining a nullifying signal may determine that there is a signal providing positive interference to interfere with the detected signal and render it ineffective. This may result in a resultant signal that has its message rendered invalid or unable to be read. In a further embodiment, the signal processor for determining a nullifying signal may determine a different form of interference for different time portions of the detected signal. This may be used, for example, to cancel a message preamble and invalidate a message checksum.

The signal processor may include a signal deviationer for adding a deliberate deviation of random or pseudo random nature to the nullifying signal. This has the advantage of preventing an incoming signal from adapting to the nullifying signal and thereby rendering it ineffective.

A passive mode of the signal processor may be enabled to monitor received signals and an active mode of the signal processor may be enabled when signal characteristics of a detected signal on a receiving antenna meet the trigger threshold. This has the advantage of enabling a low-power, standby passive mode when no incoming signal is detected.

The one or more receiving and transmitting antennas may be arranged to provide one or more axis of sufficient signal sensitivity suitable for a current application of the shield device. The receiving and transmitting antennas may provide suitable receive and transmit gain at target frequencies for a current application of the shield device.

In some embodiments, the shield device may protect a protected electronic device wherein the detected signal is an unwanted incoming signal to the protected electronic device positioned within a transmission field of the shield device. In another application, the shield device may protect a protected electronic device from leaking the detected signal wherein the detected signal is a leaking signal from the protected electronic device positioned within a transmission field of the shield device. The shield device may provide both forms of protection (e.g., the stopping of a leaking detected signal and the stopping of an interfering, nefarious signal) simultaneously for protected electronic devices within its field range.

In some embodiments, the shield device may be provided as a portable device with a portable power supply or connectable to a power source. In another embodiment, the shield device may be provided in an integrated circuit for protecting integrated electronic components of a device.

In some embodiments, the shield device may protect remote keyless entry fobs with target frequencies in the range of 125 KHz or 134.5 KHz from relay attacks.

According to another aspect of the present disclosure there is provided a signal processing method for providing a radio frequency radiation shield, comprising: detecting a near field radio frequency signal from one or more receiving antennas for target frequencies; responsive to detecting a signal characteristic of a detected signal on a receiving antenna meeting a trigger threshold, sampling signal characteristics of the detected signal; determining a nullifying signal that results in interference with the detected signal to nullify the detected signal, the nullifying signal comprising a modulated version of the detected signal; generating the nullifying signal; and controlling the transmitting of the nullifying signal using a transmitting antenna.

The method may include repeating the sampling and transmitting of a determined nullifying signal at time intervals to provide the nullifying signal in response to a presence and form of the detected signal.

The determining a nullifying signal may comprise: determining that there is a signal providing destructive interference with the detected signal to cancel or dampen the detected signal; determining that there is a signal providing positive interference to interfere with the detected signal and render it ineffective; and/or determining that there is a different form of interference for different time portions of the detected signal.

The method may include: disabling or ignoring the receiving antenna once a detected signal is sampled; enabling the transmitting antenna to transmit the nullifying signal; disabling the transmitter after a transmitting interval; enabling or reading the receiving antenna to resample the detected signal; and repeating the process as long as a detected signal is received.

The method may include adding a deliberate deviation of random or pseudo random nature to the nullifying signal.

The method may provide a passive mode of a signal processor to monitor received signals and an active mode of the signal processor when signal characteristics of a detected signal on a receiving antenna meet the trigger threshold.

According to a further aspect of the present disclosure there is provided a signal processing system for providing a radio frequency radiation shield, comprising: a signal receiver for receiving a detected near field radio frequency signal from one or more receiving antennas for target frequencies; a signal sampler for, responsive to detecting a signal characteristic of a detected signal on a receiving antenna meeting a trigger threshold, sampling signal characteristics of the detected signal; a signal nullifier for determining a nullifying signal that results in interference with the detected signal to nullify the detected signal, the nullifying signal comprising a modulated version of the detected signal; and a signal controller for controlling the transmitting of the nullifying signal using a transmitting antenna.

According to a further aspect of the present disclosure there is provided a radio frequency radiation shield device, the device comprising: a receiver for detecting a near field radio frequency signal including one or more receiving antennas for target frequencies; a signal processor for, responsive to detecting a signal characteristic of a detected signal on a receiving antenna meeting a trigger threshold: sampling signal characteristics of the detected signal; and determining a nullifying signal that results in destructive interference with the detected signal to nullify at least part of the detected signal; a signal generator for generating the nullifying signal; and a transmitter including a transmitting antenna at the target frequencies for transmitting the nullifying signal.

According to a further aspect of the present disclosure there is provided a computer program product comprising a computer readable storage medium having program instructions embodied therewith, the program instructions executable by a processor to cause the processor to perform a method, the method comprising: detecting a near field radio frequency signal from one or more receiving antennas for target frequencies; responsive to detecting a signal characteristic of a detected signal on a receiving antenna meeting a trigger threshold, sampling signal characteristics of the detected signal; determining a nullifying signal that results in destructive interference with the detected signal to nullify at least part of the detected signal; generating the nullifying signal; and controlling the transmitting of the nullifying signal using a transmitting antenna.

BRIEF DESCRIPTION OF THE DRAWINGS

The subject matter regarded as the disclosure is particularly pointed out and distinctly claimed in the concluding portion of the specification. The disclosure, both as to organization and method of operation, together with objects, features, and advantages thereof, may best be understood by reference to the following detailed description when read with the accompanying drawings.

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Embodiments of the present disclosure include a radio frequency radiation shield device and a signal processing method for providing a radio frequency radiation shield. The shield device includes a receiver for detecting a near field radio frequency signal including one or more receiving antennas for target frequencies and a transmitter including a transmitting antenna at the target frequencies for transmitting a nullifying signal. The shield device includes a signal processor for, responsive to detecting a signal characteristic of a detected signal on a receiving antenna meeting a trigger threshold: sampling signal characteristics of the detected signal; and determining a nullifying signal that results in interference with the detected signal to nullify the detected signal, the nullifying signal comprising a modulated version of the detected signal, and a signal generator for generating the nullifying signal.

A radio frequency radiation shield device is described for providing a nullifying radio frequency signal to at least partially cancel out or otherwise interfere with a detected incoming radio frequency signal. The shield device may be used in a range of situations. In some situations, the shield device may be used to protect another device in the vicinity of the shield device, such as a remote keyless entry (RKE) vehicle device, a radio frequency identification (RFID) access card or sensitive equipment, by preventing an incoming signal from reaching the protected device. In other situations, the shield device may protect against signal leakage from a signal protected area or device.

Figure 1:
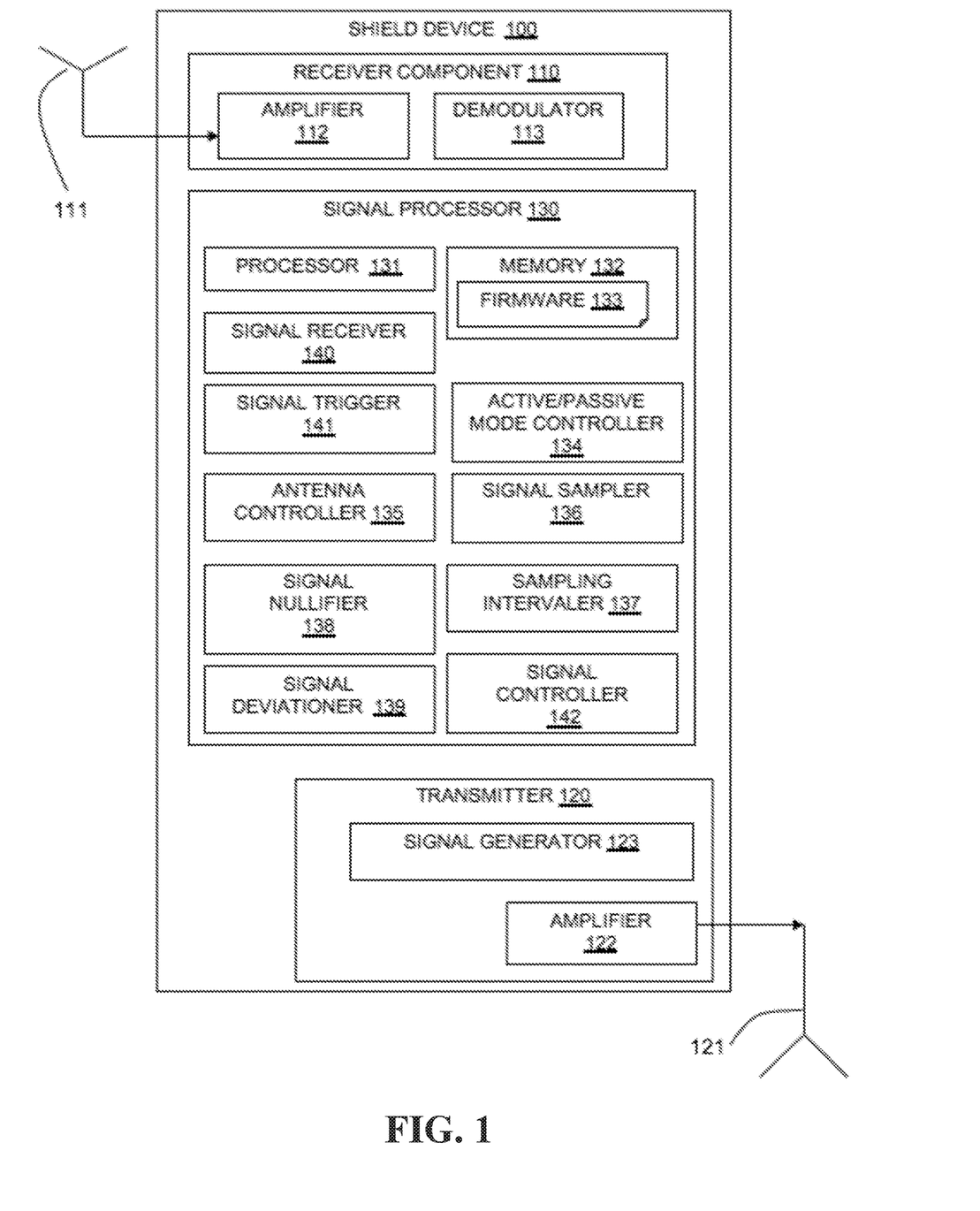
FIG. 1 illustrates a block diagram of an example embodiment of a shield device, in accordance with embodiments of the present disclosure.

Referring to FIG. 1, illustrated is an example embodiment of a radio frequency shield device 100, in accordance with the present disclosure.

The radio frequency radiation shield device 100 includes one or more receiving antennas in a receiving antenna arrangement 111 for detecting a near field radio frequency signal at target frequencies and one or more transmitting antennas in a transmitting antenna arrangement 121 for transmitting a dampening or cancelling radio frequency signal in response to detecting an incoming signal on the receiving antenna arrangement 111.

The antennas may be suitable for a signal frequency range for a given application of the shield device 100.

For each of the receiving and transmitting antenna arrangements 111, 121 one or more antenna may be used; alternatively, a combined receiving and transmitting antenna may be used providing both the receiving and transmitting antenna arrangements 111, 121 in a single antenna.

In some embodiments, two antennas may be provided at 90 degrees to provide a greater coverage of the receiving or transmitting area. Near field antenna are highly directional as they work on the flow of magnetic flux. The signal from a near field antenna is strongest in front and behind and weak from the sides. To improve the signal coverage, two antennas may be provided at 90 degrees (e.g., orthogonal, perpendicular) to each other. In other embodiments, more than two receiving or transmitting antennas may be used for greater coverage. Many known arrangements of antennas may be utilized.

The receiving and transmitting antennas in the antenna arrangements 111, 121 may be tuned or unturned and may be, as examples, near field coil, ceramic chip, printed circuit or any other type of suitable antennas. In some embodiments, ferrite core coil antennas are used due to sensitivity of the chosen frequency and very low cost to produce.

The receiving antenna arrangement 111 may intercept radio waves and convert these to an electrical signal and may be part of a receiver 110 at the shield device 100 that extracts information using electronic filers to separate the radio frequency signal from other signals and may include an amplifier 112 for providing required amplification of the received signals and a demodulator 113 for detecting an incoming signal.

The transmitting antenna arrangement 121 may transmit a modulated radio signal and may be part of a transmitter 120 at the shield device 100. The transmitter 120 may include or be connected to a signal generator 123 for generating a modulated signal for transmission and an amplifier 122 for generating and driving the transmitted signals.

The antenna arrangements 111, 121 may be driven by many different types of driver or amplifier including a resonant circuit or analogue driver/amplifier.

A signal processor 130 is provided in the shield device 100 with processing capability for sampling a detected signal and determining a nullifying signal required to dampen or cancel out the detected signal and to instruct the signal generator 123 to generate the nullifying signal.

The nullifying signal may be any signal that destructively and/or otherwise interferes with the detected signal that results in the detected signal being modified, cancelled, or otherwise rendered useless for its purpose, such as an attack signal or as a leaked signal. The nullifying signal may be a dampening signal or a cancellation signal or other type of interference signal. The term positive interference is used for a signal that interferes with the detected signal in such a manner as to render it useless.

Different forms of positive or negative interference may be used at different stages or time domains of the detected signal in order to make the detected signal useless. This may cancel out the detected signal in the near field and/or target particular parts of a message in the detected incoming signal.

In the example case of protection against an attack, the nullifying signal may be an identical signal to the detected signal and may be transmitted at out of phase, which will destructively interfere and, at least partially, cancel the detected signal. In another example, a different nullifying signal that results in a frequency shift of the detected signal through positive interference will have the same result in that the detected signal is rendered ineffective and the protected device does not receive the detected signal. In other examples, a combination of destructive and positive interference may be used. This combination may be used at different stages of a message in an incoming detected signal, for example, to cancel out a message pre-amble and then positively interfere with a message checksum or cyclic redundancy check.

As the detected signal is a demodulated version of the incoming source signal, the nullifying signal may be a modulated version of the modulations of the detected signal, either provided out of phase or otherwise adapted to interfere with the incoming signal. The process demodulates the incoming signal to see if it is actually a message; if it is, then a nullifying message may be created which is modulated to form the nullifying signal.

The signal processor 130 may include a processor 131, such as a microprocessor, a hardware module, or a circuit for executing the functions of the described components which may be firmware or software units executing on the processor 131. Memory 132 may be configured to provide computer instructions 133, such as firmware, to the at least one processor 131 to carry out the functionality of the components.

The signal processor 130 may include a signal receiver 140 for receiving a detected signal from the receiver 110. The signal processor 130 may include a signal trigger 141 and an active/passive mode controller 134 for switching the signal processor 130 between active and passive states. In a passive state, the signal processor 130 may receive detected signals and may use the signal trigger 141 to measure the detected signals against a threshold of one or more signal characteristics to determine if an active state should be triggered. In some embodiments, the signal trigger 141 may have been trained to determine if an active state should be triggered. For example, a key fob with the signal trigger 141 may be put into a training mode and a fake amplification attack may be commenced by a user. The key fob may be trained from the fake amplification attack to now identify the frequencies/signals used during such an attack and if the frequencies/signals are detected in a non-training mode, the signal trigger 141 may trigger an active state.

The active/passive mode controller 134 may activate an active state if a detected signal has one or more characteristics that rise above the threshold. An active state may sample the detected signal and carry out further processing to instruct the transmission of a responding dampening signal. The active/passive mode controller 134 may deactivate the active mode when a trigger signal is no longer being received and may revert to a passive mode of operation of the signal processor 130.

The signal processor 130 may include a signal sampler 136 for sampling a received detected signal when in the active mode and a signal nullifier 138 for determining a nullifying signal to nullify the detected signal as described further below.

The detected signal may be sampled to determine basic signal characteristics. Signal processing may be used to generate and transmit the nullifying signal a fraction of a wavelength later. The signal sampling may use multiple samples to determine signal characteristics and may therefore involve a signal phase lag as filters may require a number of samples to produce the nullifying signal as an output signal.

The signal processor 130 may include a signal controller 142 (e.g., signal output component) for outputting the nullifying signal.

The signal processor 130 may include a sampling intervaler 137 for determining intervals between the signal sampling and transmitting the nullifying signal. An antenna controller 135 may be provided for switching between receiving a detected signal from the receiving antenna arrangement 111 and transmitting a nullifying signal from the transmitting antenna arrangement 121. The antenna controller 135 may be part of the signal processor 130 or may be a separate component.

The signal processor 130 may include a signal deviationer 139 for adding a deliberate deviation signal of a random nature to the dampening signal to prevent an attacker from adapting the incoming signal that is being detected.

The shield device 100 may take various forms and sizes and may be so small it fits inside an integrated circuit, say a hardware security module (HSM) or trusted platform module (TPM) or may be larger to protect an area or room from signal leakage as described further below.

Figure 2:
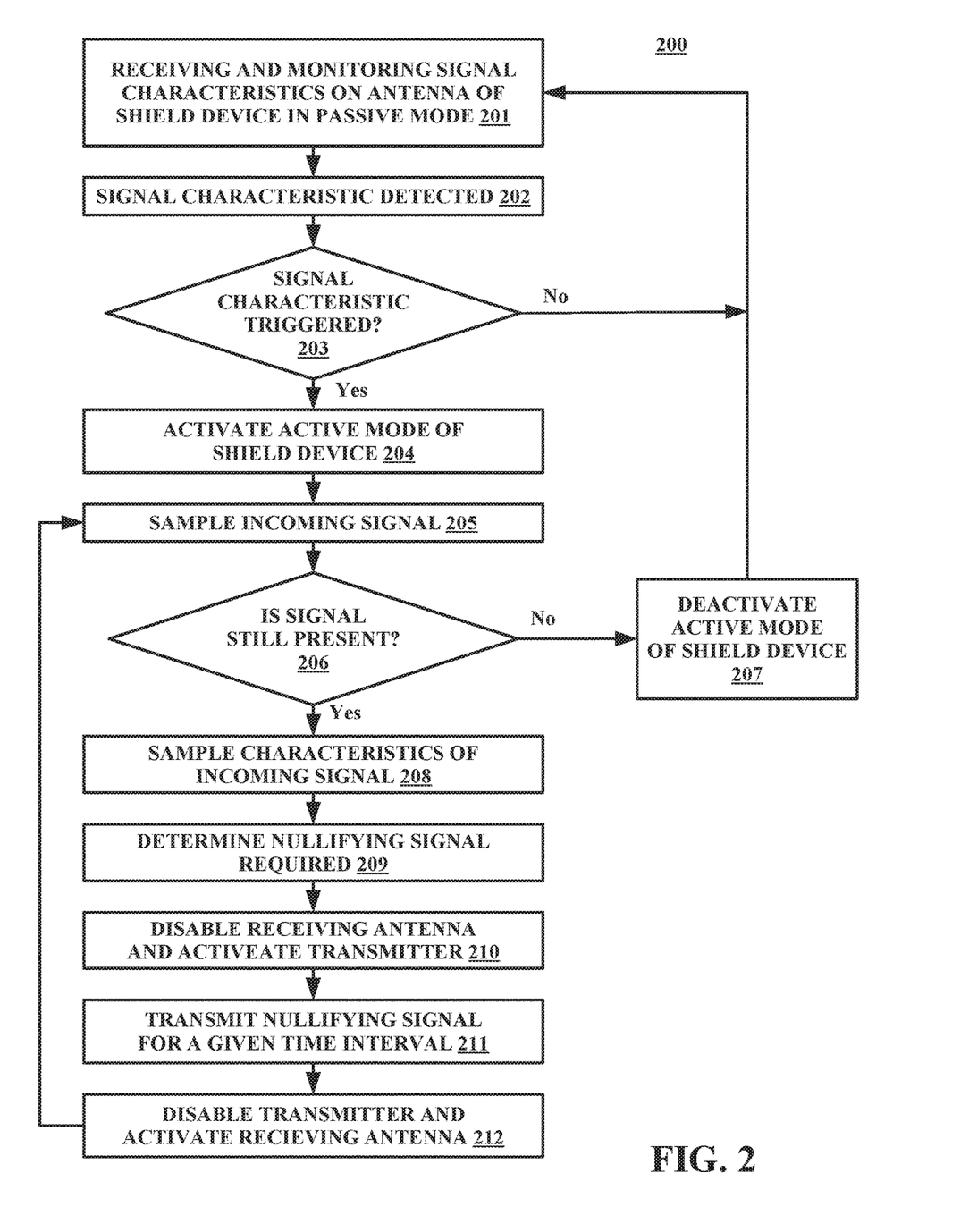
FIG. 2 illustrates a flow diagram of an example embodiment of a method, in accordance with embodiments of the present disclosure.

Referring to FIG. 2, illustrated is a flow diagram showing an example embodiment of the method 200 as carried out at the signal processor 130 of the shield device 100, in accordance with embodiments of the present disclosure.

The method 200 begins at operation 201, where a processor receives and monitors signal characteristics of a detected signal at the receiving antenna arrangement 111 of the shield device 100 when the device is in a passive mode. The method 200 proceeds to operation 202, where a signal characteristic is detected. The method 200 proceeds to decision block 203 where it is determined if the detected signal characteristic meets a predefined trigger threshold. If the detected signal characteristic does not meet the trigger threshold at decision block 203, the method 200 begins again, reverting back to operation 201 where the processor continues monitoring the detected signal to detect a further change in the characteristic.

The signal characteristic may include one or more of a change or level of: frequency, modulation timing, amplitude and phase. For example, a signal characteristic may be a rise in signal amplitude. Sophisticated signal characteristics may be monitored and detected if the aim is detection of a known form of incoming signal.

If, at decision block 203, the detected signal characteristic meets the trigger threshold, the method 200 proceeds to operation 204 where an active mode of the shield device is activated, in which the detected signal is sampled and nullified by generating a nullifying transmitted signal.

The method 200 proceeds to operation 205, where while the device is in the active mode, it samples the incoming signal. The method 200 proceeds to decision block 206 where it is determined if the signal is still present. If the signal is no longer present, at decision block 206, the method 200 proceeds to operation 207, where the active mode of the shield device is deactivated and the method 200 begins again at operation 201 and continues to monitor detected signals in the passive mode.

If the detected signal is still present at decision block 206, the method 200 proceeds to operation 208, where the processor samples the characteristics of the incoming signal, and based on the samples, a processor obtains a stable lock on the incoming signal. The sampled characteristics may include, but are not limited to, the frequency, modulation, timing, amplitude and phase of the incoming signal. The method 200 proceeds to operation 209 where a required nullifying signal for the sampled signal is determined.

The nullifying signal may be determined at operation 209 as a signal that destructively or positively interferes with the sampled signal that results in the detected signal being modified, cancelled or otherwise rendered useless. For example, the nullifying signal may be an out of phase, modulated version of the sampled signal in order to cancel the incoming signal.

The method 200 proceeds to operation 210, where a receiving antenna arrangement is disabled and the transmitting antenna arrangement is activated. The method 200 proceeds to operation 211, where the transmitting antenna arrangement transmits the nullifying signal for a given time interval. The nullifying signal may modulate the output of the transmitting antenna arrangement to re-enforce the antenna's natural resonance.

The time interval of sampling and transmitting is dependent on the implementation of the shield device and may be in the order of nanoseconds to many seconds with the aim of preventing the receiving of an intact message in a detected incoming signal.

The method 200 proceeds to operation 212, where the transmitting antenna arrangement is disabled and the receiving antenna arrangement is reactivated. In some embodiments, the method 200 may loop to operation 205 and continue sampling an incoming signal. The method 200 may continue to loop in order to nullify the sampled detected signal until the signal is no longer present, after the signal is no longer present the method 200 may end. In some embodiments, the method 200 may end after operation 212.

In an alternative embodiment, a receiving antenna may continue to receive a detected signal and may ignore or continue sampling the received signal whilst transmitting a nullifying signal.

Figure 3:
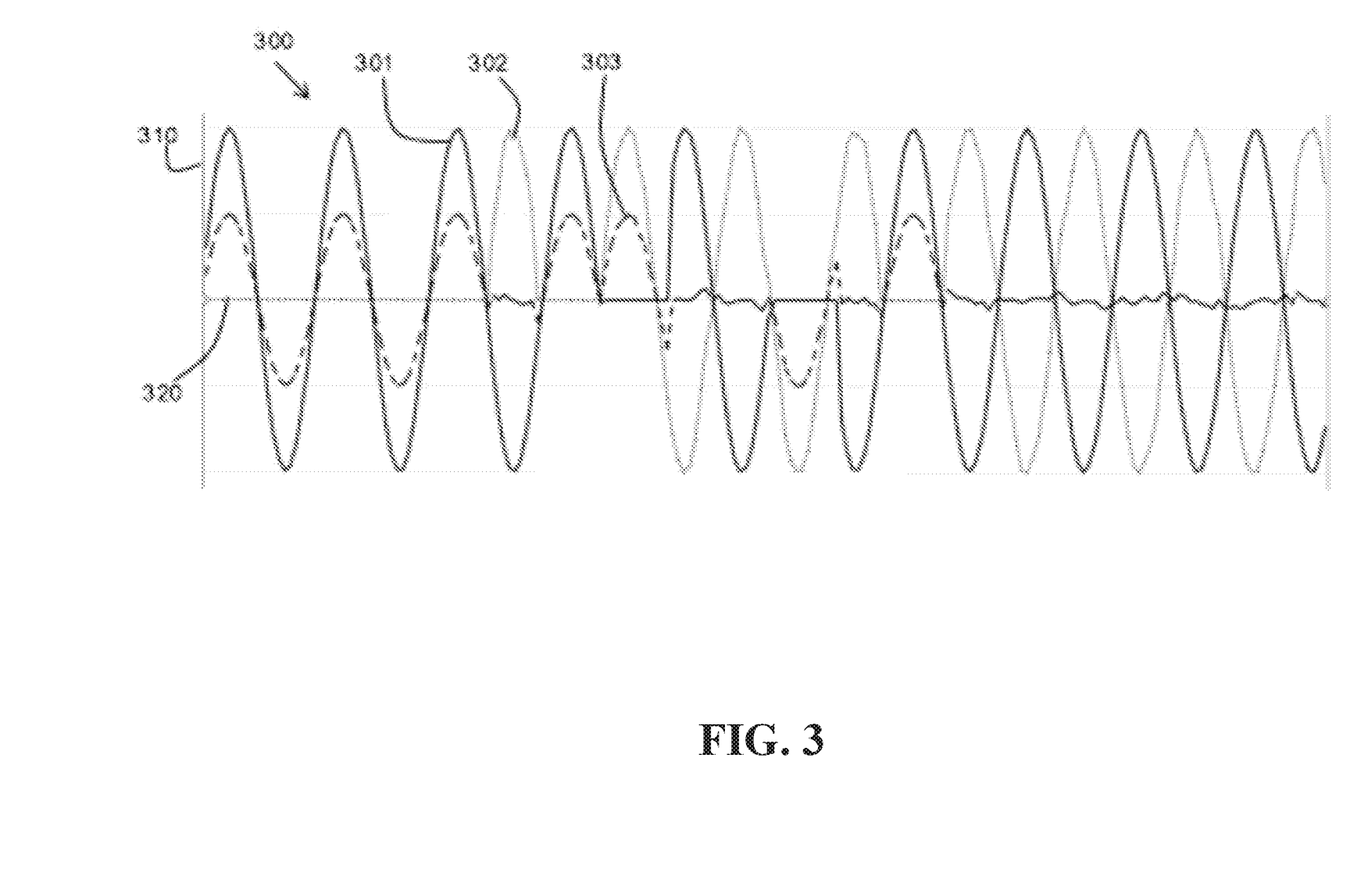
FIG. 3 illustrates a schematic diagram of a waveform illustrating the result of embodiments of the present disclosure.

Referring to FIG. 3, illustrated is a schematic diagram showing a waveform graph 300 of a signal amplitude 310 against a time 320 of a detected source signal 301, a nullifying signal 302, and a resultant signal 303. The amplitude of the resultant signal 303 is reduced on the waveform graph 300 for illustration. The graph 300 shows the overall process of dampening the detected source signal 301 with the nullifying signal 302 in the form of a dampening signal to result in a cancellation of the source signal 301. This illustrates the advantages of the present disclosure by empirically demonstrating how a nullifying signal 302 can be used to protect a device.

Figure 4A:
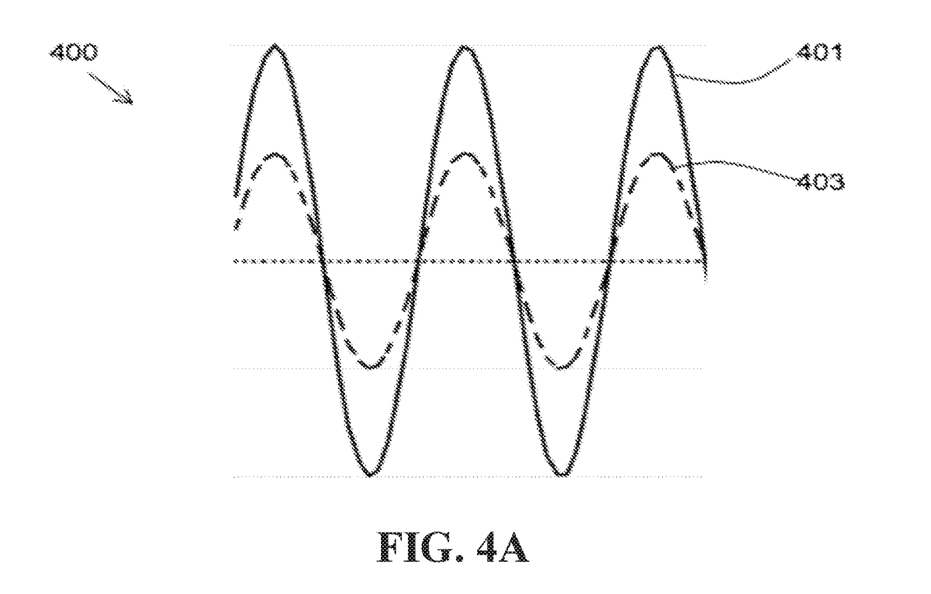
FIGS. 4A, 4B, and 4C illustrate various schematic diagrams of portions of the waveform of FIG. 3, in accordance with embodiments of the present disclosure.
Figure 4B:
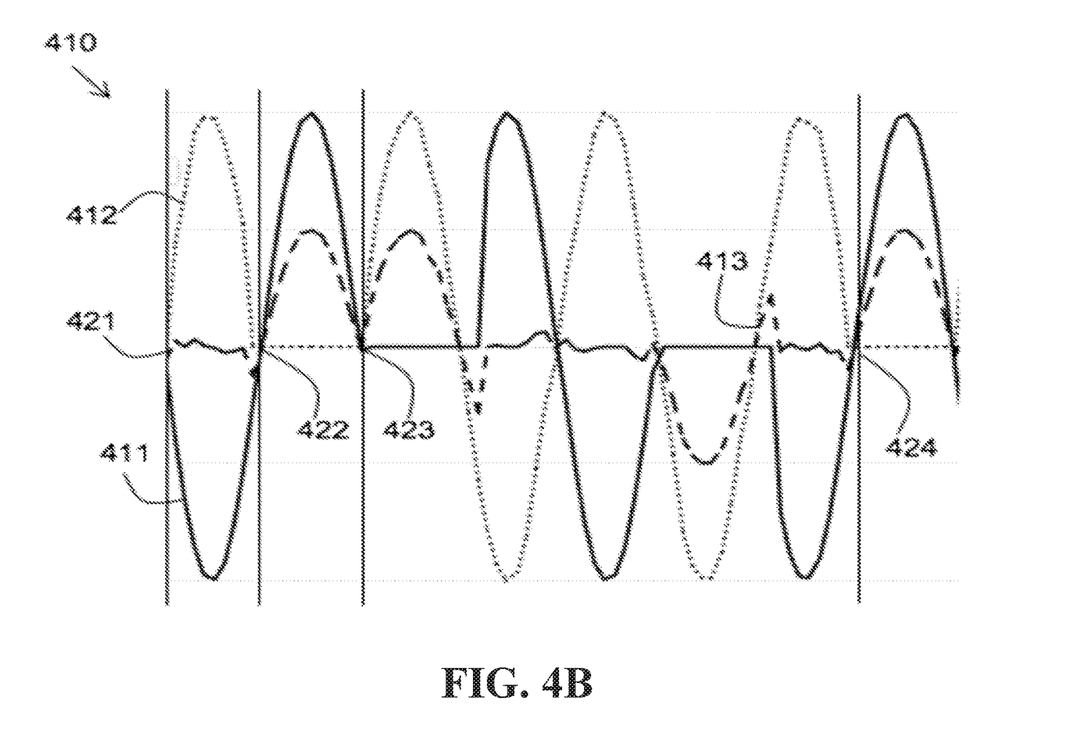
Figure 4C:
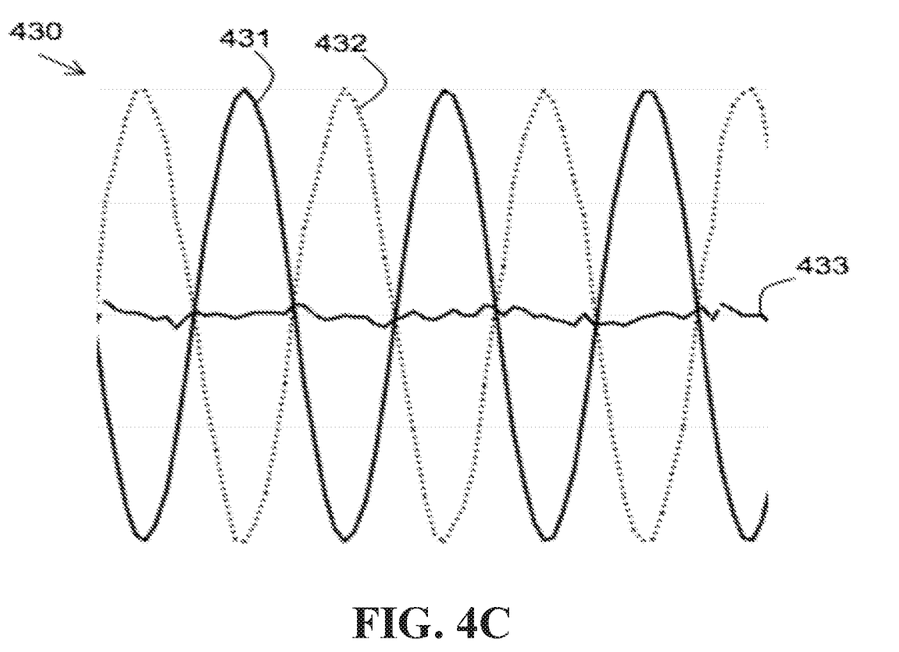

Referring to FIGS. 4A, 4B and 4C, illustrated are schematic diagrams showing graph portions 400, 410, 430 of the waveform graph 300 of FIG. 3.

FIG. 4A shows the graph portion 400 of a detected source signal 401 with an illustrated resultant signal 403 with a lower illustrated amplitude for illustration purposes so that both the detected source signal 401 and a resultant signal 403 show on a single graph.

FIG. 4B shows the graph portion 410 of a detected source signal 411 and at time point 421 along the horizontal axis when a dampening signal 412 is applied, and at time point 422 when the dampening signal 412 stops in order to re-sample the detected signal. At a time point 423, the dampening signal 412 starts again, then stops again at a time point 424. The resultant signal 413 settles into a resultant null signal.

FIG. 4C shows a graph portion 430 of a settled pattern of a detected source signal 431 and a dampening signal 432 cancelling out the detected source signal 431 with an almost flat resultant signal 433.

A source signal is modulated or varied over a base signal in order to send data. The modulation may be Frequency Modulation, in which the frequency is modulated, or Amplitude Modulation in which the amplitude is modulated. To receive the source data, the signal is demodulated. In FIGS. 3 and 4A-4C, the source signal is amplitude modulated. So, the source signal is either on (e.g., sine wave) or off (e.g., flat) to represent two binary states of 1 and 0. Putting the modulations together results in a message. By monitoring signal characteristics by looking at source signal amplitude, frequency and phase, it can be determined how the source signal is communicating data and a nullifying signal may be generated to cancel out that message.

There may also be a small deliberate deviation of random (or pseudo-random) nature added to the nullifying signal. The deliberate deviation helps prevent an attacker from adapting to the nullifying signal.

The additional deliberate deviation modulation may be used because in the real world it is not possible to remove the source signal 100%; therefore, adding an additional small modulation confuses the receiving device as to what the signal really is, rendering the incoming signal useless.

Figure 5:
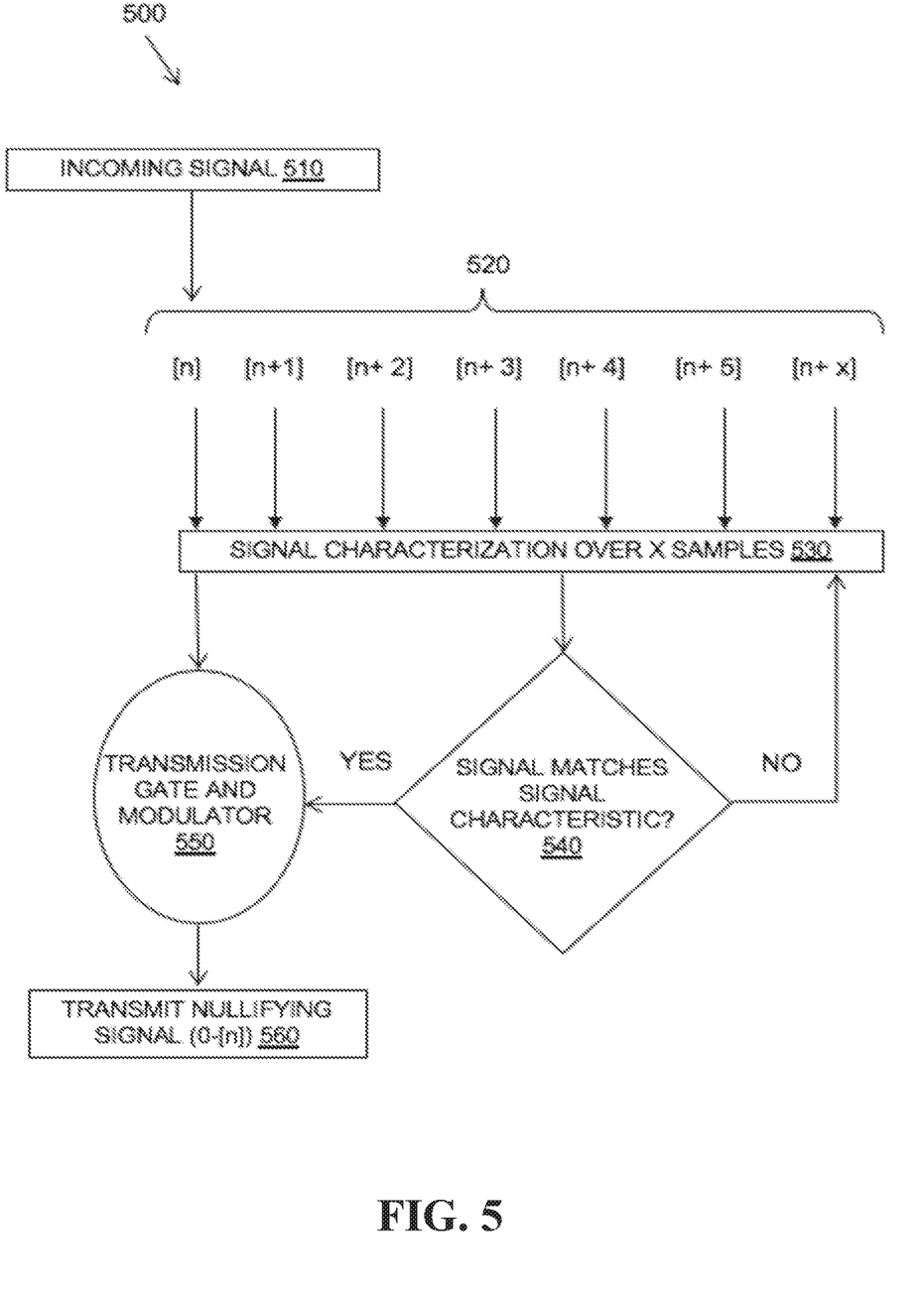
FIG. 5 illustrates a schematic diagram of an example embodiment of a signal sampling aspect of the method and system, in accordance with embodiments of the present disclosure.

Referring to FIG. 5, illustrated is a schematic diagram 500 of an example embodiment of a signal sampling aspect of the described method and system, in accordance with embodiments of the present disclosure.

The incoming signal 510 has signal characteristics in the form of its frequency, phase, and amplitude shown. The detected incoming signal may include amplitude modulation to include a message by a sequence of either on (e.g., sine wave) or off (e.g., flat) to represent a sequence of bits 1, 0 of the message. The incoming signal may be demodulated into the message to get message bits for nullifying; or alternatively, broader signal characteristics such as frequency and amplitude may be used for determining and generating the nullifying signal depending on the use case.

The incoming signal 510 is sampled to determine that it is the detected signal with the signal characteristics. Signal processing needs x number of samples 520 sent to an array of x elements 530 to determine 540 if the signal matches the signal characteristics. The signal processor might take until [n+p] as in the pth sample in the bucket to determine that the signal matches the signal characteristics.

Once it is determined that the incoming signal matches the signal characteristics and identifies the signal as the signal to be nullified, then a transmission gate and modulator 550 may latch the output on and the negative of [n] or (0−[n]) may then be transmitted 560.

The determination 540 has a phase lag but, once triggered, may transmit near-perfectly in sync with the incoming signal. The incoming signal would be sampled to determine basic signal characteristics (such as the frequency, phase, amplitude) and the transmission of the nullifying signal may happen a fraction of a wavelength later.

Figure 6A:
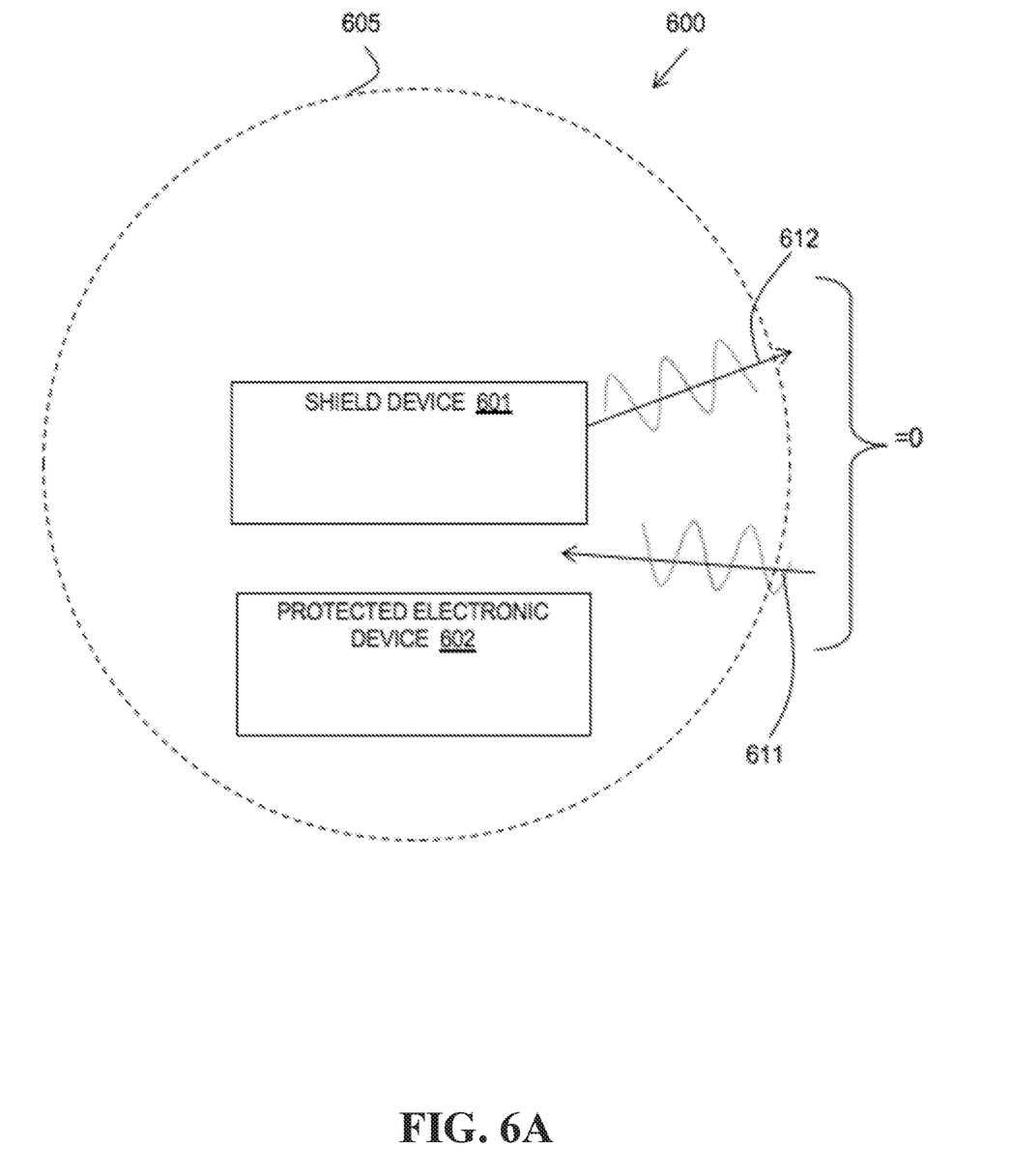
FIGS. 6A and 6B illustrate various schematic diagrams of two scenarios of use of a shield device, in accordance with embodiments of the present disclosure.

Referring to FIG. 6A, illustrated is a schematic diagram 600 showing a first scenario of an application of a described shield device 601. A protected electronic device 602 may be placed near the shield device 601. An incoming signal 611 detected by the shield device 601 may be nullified by a transmitted nullifying signal 612 from the shield device 601. This results in the incoming signal 611 being rendered ineffective at the protected electronic device 602. Any electronic device within a transmitting area 605 of the shield device 601 is protected from the incoming signal 611.

One described embodiment of the first scenario of FIG. 6A is the shield device 601 provided as a remote keyless entry (RKE) shield device. The RKE shield device may be a small, portable device powered by a USB or battery and designed to be placed near to where a user keeps their keys.

In the event of an RKE style attack, the RKE shield device senses the near field message and immediately transmits a nullifying field so the key fob never receives a valid message. In some embodiments, the nullifying signal is a cancellation signal so that no signal is received at the key fob. Once the RKE attack ends, the RKE shield device goes back into passive mode.

In the example embodiment of a RKE key fob, the detected source signal is the RKE attack signal, the nullifying signal 612 is the transmitted signal produced by the RKE shield device and the resultant signal is what the key fob sees.

The RKE shield device may include tuned antennas tuned to radio frequencies in the range from 120 KHz to 140 KHz. A more specific range for the RKE shield example may be 125 KHz or 134.5 KHz, depending on the region.

In the example implementation for RKE shielding purposes, a message transmitted from a vehicle to the key fob is typically less than 100 ms. As such, any transmission period that covers more than a message pre-amble is suitable as a time interval.

In an embodiment, the RKE shield device may transmit a 90 degrees out of phase signal and modulates the signal to ensure that no matter how sensitive the key fob is, the attacker's message is never received.

The RKE shield device senses an attack and protects keys within range (e.g., within the transmitting area 605). A user does not have to do anything apart from place their keys nearby. Multiple key fobs may be protected by a single RKE shield device, if they are placed within range. The shield device provides a protective a radio force field and does not require any change to the existing design of vehicles already in production and sold.

The RKE shield device is independent of a vehicle make or model and can used on existing vehicles vulnerable to remote keyless entry attacks. It detects the simple presence of RKE style attacks and protects the key fob irrespective of modulation specifics.

In another described embodiment of the first scenario of FIG. 6A, the shield device 601 may be used to protect RFID cards, for example, high security door access tags that can be attacked via relay stations. Two relay stations working together can be used to open a high security door where it is controlled by an access card. If the access card is protected by the described shield device, such attacks are powerless.

In a further described embodiment of the first scenario of FIG. 6A, the shield device 601 may be used to protect sensitive equipment. If sensitive equipment in an industrial control system is taking precise measurements and is physically vulnerable to outside emitted radio noise signals, the described shield device may sense the levels of the noise inside the enclosure and transmit a dampening field purely to nullify it.

In a further embodiment of the first scenario of FIG. 6A, a hardware security module (HSM) or trusted platform module (TPM) may be sensitive to outside attack signals at the resonant frequency of some internal part of the silicon or construction. The shield device 601 could be separate or built into such a device to shield internal components from such an external signal targeted at modifying the behaviour of the device.

The shield device 601 could also be used to protect sensitive equipment or sensors from external influence. Take for example an inertial sensor used for the detection of ground vibrations used in earthquake monitoring. Such an inertial sensor would be sensitive to signals transmitted to it at the sensor's natural resonant frequency. This side channel attack could be used to trick the sensor into seeing vibration that is not actually present. The shield device 601 could be configured to be sensitive to the resonant frequency of the sensor it is protecting and if that signal is ever sent to the sensor the shield device 601 may effectively cancel it out protecting the ground sensor from false vibration readings.

The same could be applied to many different types of sensors, including gyroscopes, strain sensors, MEMs microphones.

Figure 6B:
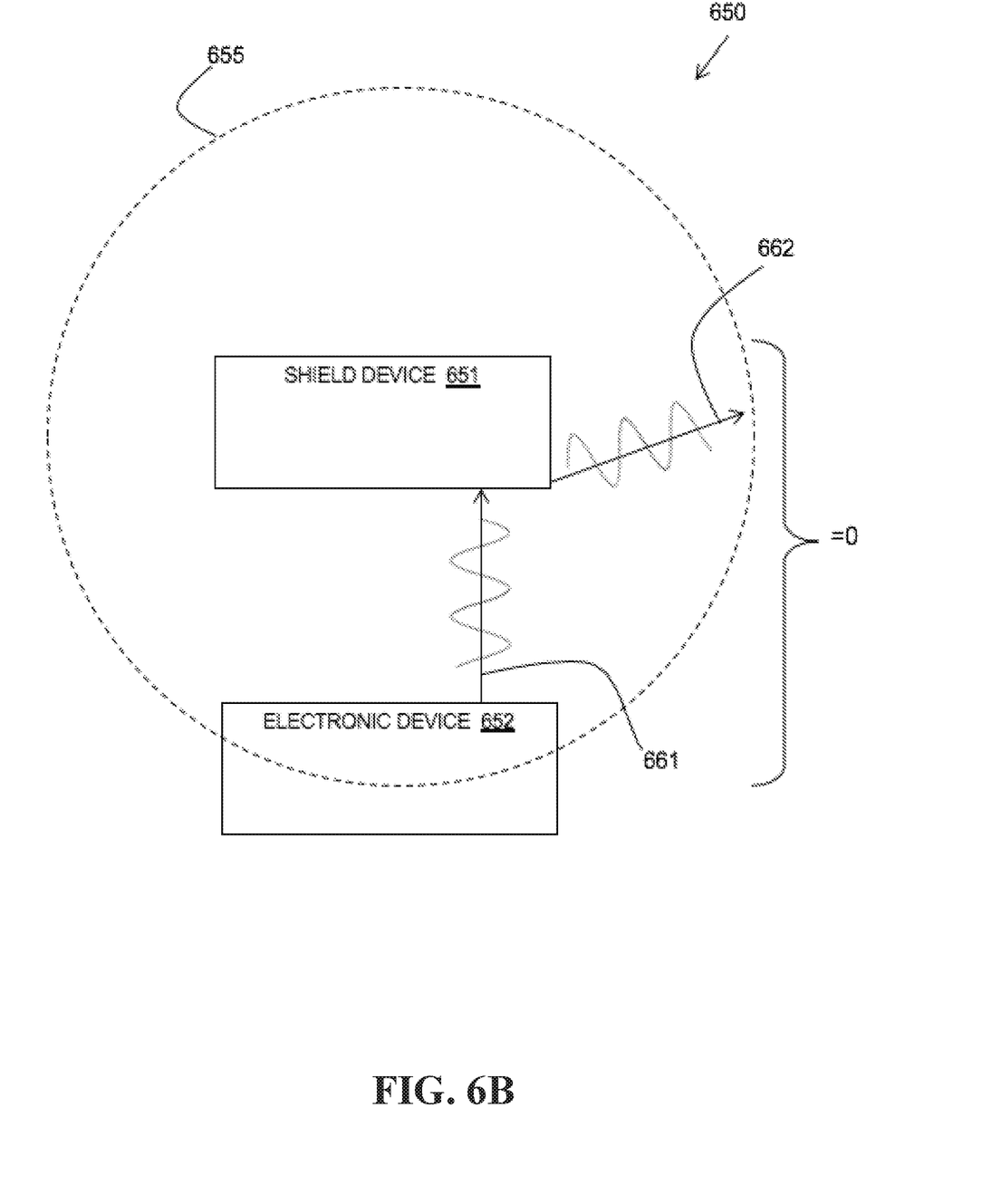

Referring to FIG. 6B, illustrated is a schematic diagram 650 showing a second scenario of an application of a described shield device 651. An electronic device 652 may leak a radio frequency signal 661. The shield device 651 may detect the leaked signal 661 and may dampen the leaked signal 661 by transmitting a nullifying signal 662 in the form of a dampening or cancellation signal from the shield device 651. This results in the leaked signal 661 being cancelled. This is effective for an electronic device 652 leaking a signal 661 within an area 655 of the shield device 651.

In a described embodiment of the second scenario of FIG. 6B, the shield device 651 can also be used to protect against leakage from a Faraday cage. For example, a Faraday shielded room may be used in a bank or corporations to ensure no bugs, radios, phones, etc. work when inside the room. The shield device 651 may be used on the outside of the room to detect any leakage from the room and effectively scramble and nullify it. In essence, the shield device 651 could be used to re-enforce a Faraday cage.

The shield device 651 may also be used to protect sensitive cryptographic, computation or signal processing equipment from inadvertently leaking sensitive data through side channels. Such as electromagnetic leakage from a processor that allows an attacker with the correct equipment to monitor electromagnet output from a processor to infer what it is doing. Side channel attacks are becoming more common as technology for implementing such complex attacks becomes cheaper.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A radio frequency radiation shield device, the device comprising:
   a receiver for detecting a near field radio frequency signal, the receiver including one or more receiving antennas for target frequencies;
   a signal processor for, responsive to detecting a signal characteristic of a detected signal on a receiving antenna meeting a trigger threshold:
   sampling signal characteristics of the detected signal; and
   determining a nullifying signal that results in interference with the detected signal to render the detected signal ineffective, the nullifying signal comprising a modulated version of the detected signal that is identified in response to the detected signal;
   a signaler for generating the nullifying signal; and
   a transmitter for transmitting the nullifying signal, the transmitter including a transmitting antenna at the target frequencies.

2. The shield device as claimed in claim 1, wherein the signal processor is further operable for repeating the sampling and transmitting of a determined nullifying signal at time intervals to provide the nullifying signal in response to a presence and form of the detected signal.

3. The shield device as claimed in claim 1, wherein the signal processor is further operable for determining a signal providing destructive interference with the detected signal to cancel or dampen the detected signal.

4. The shield device as claimed in claim 1, wherein the signal processor is further operable for determining a different form of interference for different time portions of the detected signal.

5. The shield device as claimed in claim 4, wherein the signal processor determines a first form of interference that cancels a pre-amble of the detected signal at one moment in time, and wherein the signal processor determines a second form of interference that renders a cyclic redundancy check of the detected signal unreadable.

6. The shield device as claimed in claim 1, wherein the signal processor includes a signal deviationer for adding a deliberate deviation of random or pseudo random nature to the nullifying signal.

7. The shield device as claimed in claim 1, wherein a passive mode of the signal processor is enabled to monitor received signals and an active mode of the signal processor is enabled when signal characteristics of a detected signal on a receiving antenna meet the trigger threshold.

8. The shield device as claimed in claim 1, wherein the one or more receiving and transmitting antennas are arranged to provide one or more axis of sufficient signal sensitivity suitable for a current application of the shield device.

9. The shield device as claimed in claim 1, wherein the receiving and transmitting antennas are operable for providing suitable receive and transmit gain at target frequencies for a current application of the shield device.

10. The shield device as claimed in claim 1, wherein the shield device is a portable device with a portable power supply or connectable to a power source.

11. The shield device as claimed in claim 1, wherein the shield device is provided in an integrated circuit for protecting integrated electronic components of a device.

12. The shield device as claimed in claim 1, wherein the shield device is operable for protecting a protected electronic device wherein the detected signal is an unwanted incoming signal to the protected electronic device positioned within a transmission field of the shield device.

13. The shield device as claimed in claim 1, wherein the shield device is operable for protecting a protected electronic device from leaking, wherein the protected electronic device includes a Faraday cage, wherein the shield device protects the Faraday cage from leaking by scrambling a leaked detected signal, and wherein the shield device simultaneously blocks the detected signal, which is incoming and unwanted.

14. The shield device as claimed in claim 1, wherein the shield device is operable for protecting remote keyless entry fobs with target frequencies in the range of 125 KHz or 134.5 KHz from relay attacks.

15. The shield device as claimed in claim 1, wherein the signaler for generating the nullifying signal generates the nullifying signal in response to the signal processor identifying that the detected signal includes a message.

16. A signal processing method for providing a radio frequency radiation shield, the method comprising:
    detecting a near field radio frequency signal from one or more receiving antennas for target frequencies;
    responsive to detecting a signal characteristic of a detected signal on a receiving antenna meeting a trigger threshold, sampling signal characteristics of the detected signal;
    determining a nullifying signal that results in interference with the detected signal to render the detected signal ineffective, the nullifying signal comprising a modulated version of the detected signal that is identified in response to the detected signal;
    generating the nullifying signal; and
    controlling the transmitting of the nullifying signal using a transmitting antenna.

17. The method as claimed in claim 16, the method further comprising repeating the sampling and transmitting of a determined nullifying signal at time intervals to provide the nullifying signal in response to a presence and form of the detected signal.

18. The method as claimed in claim 16, wherein determining the nullifying signal includes determining a signal that provides destructive interference with the detected signal to cancel or dampen the detected signal.

19. The method as claimed in claim 16, wherein determining the nullifying signal includes determining a different form of interference for different time portions of the detected signal.

20. The method as claimed in claim 16, the method further comprising:
    disabling or ignoring the receiving antenna once a detected signal is sampled;
    enabling the transmitting antenna to transmit the nullifying signal;
    disabling the transmitter after a transmitting interval;
    enabling or reading the receiving antenna to resample the detected signal; and
    repeating the process as long as a detected signal is received.

21. The method as claimed in claim 16, the method further comprising adding a deliberate deviation of random or pseudo random nature to the nullifying signal.

22. The method as claimed in claim 16, the method further comprising providing a passive mode of a signal processor to monitor received signals and an active mode of the signal processor when signal characteristics of a detected signal on a receiving antenna meet the trigger threshold.

23. A signal processing system for providing a radio frequency radiation shield, comprising:
    a signal receiver for receiving a detected near field radio frequency signal from one or more receiving antennas for target frequencies;
    a signal sampler for, responsive to detecting a signal characteristic of a detected signal on a receiving antenna meeting a trigger threshold, sampling signal characteristics of the detected signal;
    a signal nullifier for determining a nullifying signal that results in interference with the detected signal to render the detected signal ineffective, the nullifying signal comprising a modulated version of the detected signal that is identified in response to the detected signal; and
    a signal controller for controlling the transmitting of the nullifying signal using a transmitting antenna.

24. A radio frequency radiation shield device, the device comprising:
    a receiver for detecting a first near field radio frequency signal at one or more target frequencies that meet a trigger threshold;
    a signal processor for:

sampling signal characteristics of the first near radio field signal to obtain a plurality of samples; and determining, based, at least in part, upon the plurality of samples, characteristics of a nullifying signal that results in interference with the first near radio field signal to render at least part of the first near radio field signal ineffective, with the nullifying signal being a modulated version of the first near radio field signal that is incorporated in response to the first near radio signal;

a signal generator for generating the nullifying signal as an electrical signal; and a transmitter for transducing the nullifying signal into the form of a second near field radio frequency signal at the one or more target frequencies.

25. A computer program product comprising a computer readable storage medium having program instructions embodied therewith, the program instructions executable by a processor to cause the processor to perform a method, the method comprising:

detecting a near field radio frequency signal from one or more receiving antennas for target frequencies;

responsive to detecting a signal characteristic of a detected signal on a receiving antenna meeting a trigger threshold, sampling signal characteristics of the detected signal;

determining a nullifying signal that results in interference with the detected signal to render at least part of the detected signal ineffective, wherein the nullifying signal comprises a modulated version of the detected signal that is identified in response to the detected signal;

generating the nullifying signal; and controlling the transmitting of the nullifying signal using a transmitting antenna.

\* \* \* \* \*